(12) United States Patent
Zhu et al.

(10) Patent No.: US 9,571,204 B2
(45) Date of Patent: Feb. 14, 2017

(54) LED OPTICAL COMMUNICATION RECEIVING LENS AND LED OPTICAL COMMUNICATION SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Si-Si Xiong, Beijing (CN); Xiao-Fei Wu, Beijing (CN); Tong Yang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 5 days.

(21) Appl. No.: 14/814,061

(22) Filed: Jul. 30, 2015

(65) Prior Publication Data
US 2016/0056899 A1  Feb. 25, 2016

(30) Foreign Application Priority Data
Aug. 20, 2014  (CN) .......................... 2014 1 0411178

(51) Int. Cl.
| | | |
|---|---|---|
| H04B 10/00 | (2013.01) |
| H04B 10/60 | (2013.01) |
| G02B 17/08 | (2006.01) |
| G02B 3/04 | (2006.01) |
| G02B 3/00 | (2006.01) |

(52) U.S. Cl.
CPC ............. *H04B 10/60* (2013.01); *G02B 17/086* (2013.01); *G02B 3/04* (2013.01); *G02B 2003/0093* (2013.01)

(58) Field of Classification Search
USPC ................................... 398/212; 359/642–830
See application file for complete search history.

(56) References Cited

U.S. PATENT DOCUMENTS

| | | | | |
|---|---|---|---|---|
| 3,297,393 A | * | 1/1967 | Ziegler ................. | G02B 21/02 359/660 |
| 4,477,158 A | * | 10/1984 | Pollock .................... | G02B 3/12 351/159.04 |
| 6,337,774 B2 | * | 1/2002 | Ando ........................... | 359/719 |

(Continued)

*Primary Examiner* — Agustin Bello
(74) *Attorney, Agent, or Firm* — Zhigang Ma

(57) ABSTRACT

A LED optical communication receiving lens includes a first surface and a second surface opposite to the first surface. The first surface includes a first spherical surface and a second spherical surface connected to the first spherical surface. The second surface includes a third spherical surface and a planar surface connected to the third spherical surface. A position of the LED optical communication receiving lens is defined as a three-dimensional Cartesian coordinate system (x, y, z). Sphere centers and symmetric central points of the first spherical surface, the second spherical surface, and the third spherical surface are located on the x axis. The first spherical surface and the planar surface are transmitted surfaces. The second spherical surface and the third spherical surface are reflective surfaces. The present application also relates to a LED optical communication system including the LED optical communication receiving lens.

12 Claims, 9 Drawing Sheets

(56) References Cited

U.S. PATENT DOCUMENTS

| | | | | |
|---|---|---|---|---|
| 6,369,957 B1* | 4/2002 | Ishida | G02B 3/00 | 359/719 |
| 6,624,951 B2* | 9/2003 | Hashimura | G11B 7/1374 | 359/661 |
| 6,646,817 B2* | 11/2003 | Katsuma | G11B 7/1374 | 359/719 |
| 6,657,790 B2* | 12/2003 | Kim | G11B 7/127 | 359/634 |
| 6,721,101 B2* | 4/2004 | Daniell | G02B 3/005 | 348/E13.028 |
| 6,785,057 B2* | 8/2004 | Ori | G02B 15/177 | 359/680 |
| 6,844,989 B1* | 1/2005 | Jo | G02B 13/0035 | 359/689 |
| 6,924,945 B1* | 8/2005 | Richardson | F21V 7/0025 | 359/726 |
| 6,930,841 B2* | 8/2005 | Sato | G02B 9/12 | 359/740 |
| 6,931,181 B2* | 8/2005 | Jewell | G02B 6/4206 | 359/819 |
| 6,950,241 B1* | 9/2005 | Liang | G02B 9/34 | 359/660 |
| 6,977,779 B2* | 12/2005 | Shinohara | G02B 9/16 | 359/716 |
| 6,985,184 B2* | 1/2006 | Sato | G02B 13/0025 | 348/340 |
| 6,995,923 B2* | 2/2006 | Noda | G02B 15/177 | 359/680 |
| RE39,025 E* | 3/2006 | Lee | G02B 3/10 | 359/719 |
| 7,035,018 B2* | 4/2006 | Yamakawa | G02B 13/003 | 359/691 |
| 7,088,529 B2* | 8/2006 | Kajiwara | G02B 7/021 | 359/811 |
| 7,139,454 B2* | 11/2006 | Cox | G02B 6/4206 | 359/738 |
| 7,218,454 B2* | 5/2007 | Miyano | G02B 23/243 | 359/661 |
| 7,655,896 B2* | 2/2010 | Asper | G01V 8/12 | 250/216 |
| 7,817,909 B2* | 10/2010 | Montgomery | F21V 5/04 | 359/19 |
| 7,826,148 B2* | 11/2010 | Zung | B29D 11/00019 | 359/664 |
| 8,031,407 B2* | 10/2011 | Hurwitz | G02B 1/10 | 359/558 |
| 8,059,345 B2* | 11/2011 | Feldman | G02B 3/00 | 359/794 |
| 8,541,724 B2* | 9/2013 | Roemerman | F42B 10/64 | 244/3.16 |
| 8,542,444 B2* | 9/2013 | Baba | A61B 1/00096 | 359/642 |
| 8,908,289 B2* | 12/2014 | Noda | G02B 13/18 | 359/714 |
| 8,965,193 B1* | 2/2015 | Svec | G02B 17/086 | 359/366 |
| 8,995,058 B2* | 3/2015 | Okada | G02B 5/1814 | 359/574 |
| 2001/0006434 A1* | 7/2001 | Yoo | G11B 7/1362 | 359/727 |
| 2001/0019435 A1* | 9/2001 | Ando | G11B 7/1353 | 359/15 |
| 2002/0012175 A1* | 1/2002 | Katsuma | G11B 7/1374 | 359/719 |
| 2003/0210475 A1* | 11/2003 | Shinohara | G02B 13/0035 | 359/716 |
| 2004/0125468 A1* | 7/2004 | Do | G02B 9/34 | 359/781 |
| 2004/0228008 A1* | 11/2004 | Hill | G02B 21/0056 | 359/727 |
| 2004/0263997 A1* | 12/2004 | Noda | G02B 15/177 | 359/689 |
| 2005/0007674 A1* | 1/2005 | Gan | G02B 9/58 | 359/650 |
| 2006/0268424 A1* | 11/2006 | Miyano | G02B 23/243 | 359/661 |
| 2007/0030573 A1* | 2/2007 | Batchko | G02B 26/005 | 359/665 |
| 2007/0058256 A1* | 3/2007 | Sun | G02B 9/34 | 359/569 |
| 2008/0106796 A1* | 5/2008 | Kawada | G02B 3/0037 | 359/663 |
| 2008/0198353 A1* | 8/2008 | Dodoc | G03F 7/70225 | 355/67 |
| 2008/0198481 A1* | 8/2008 | Zung | B29D 11/00375 | 359/716 |
| 2008/0247061 A1* | 10/2008 | Simkulet | G02B 13/06 | 359/730 |
| 2009/0290224 A1* | 11/2009 | Asakura | G02B 13/18 | 359/645 |
| 2009/0310465 A1* | 12/2009 | Komma | G11B 7/1395 | 369/112.08 |
| 2009/0323195 A1* | 12/2009 | Hembree | B29D 11/00278 | 359/648 |
| 2010/0214656 A1* | 8/2010 | Janik | G02B 3/04 | 359/481 |
| 2010/0259835 A1* | 10/2010 | Asami | G02B 13/06 | 359/687 |
| 2010/0265592 A1* | 10/2010 | Bowers | G02B 1/002 | 359/642 |
| 2011/0043924 A1* | 2/2011 | Saito | G02B 9/60 | 359/656 |
| 2011/0096412 A1* | 4/2011 | Tang | G02B 9/34 | 359/715 |
| 2011/0122502 A1* | 5/2011 | Nishio | G02B 25/001 | 359/645 |
| 2011/0143287 A1* | 6/2011 | Ohmura | G02B 17/0808 | 430/325 |
| 2011/0267586 A1* | 11/2011 | Tsai | G02B 13/16 | 353/20 |
| 2012/0147484 A1* | 6/2012 | Asami | G02B 13/06 | 359/753 |
| 2012/0162549 A1* | 6/2012 | Gao | G02B 27/0172 | 349/11 |
| 2012/0207008 A1* | 8/2012 | Minami | G02B 27/0037 | 369/112.23 |
| 2012/0327756 A1* | 12/2012 | Sekiguchi | G11B 7/1374 | 369/112.25 |
| 2014/0128673 A1* | 5/2014 | Cheng | G02B 13/06 | 600/109 |
| 2014/0307344 A1* | 10/2014 | Cammenga | B60R 1/088 | 359/872 |
| 2014/0340658 A1* | 11/2014 | Takano | G03B 21/28 | 353/99 |
| 2014/0362239 A1* | 12/2014 | Larson | G02B 21/361 | 348/207.11 |
| 2014/0376113 A1* | 12/2014 | Guenter | G02B 9/00 | 359/754 |
| 2015/0062406 A1* | 3/2015 | Chen | G02B 13/0045 | 348/335 |
| 2015/0062697 A1* | 3/2015 | Komatsu | G02B 5/30 | 359/365 |
| 2015/0080662 A1* | 3/2015 | Harada | G02B 23/243 | 600/176 |
| 2015/0103413 A1* | 4/2015 | Uchida | G02B 13/18 | 359/694 |
| 2015/0131175 A1* | 5/2015 | Lamontagne | G02B 7/003 | 359/830 |
| 2015/0192775 A1* | 7/2015 | Suzuki | G02B 27/0172 | 359/630 |
| 2015/0206909 A1* | 7/2015 | Fujimura | G02B 13/14 | 250/338.1 |
| 2015/0309287 A1* | 10/2015 | Kondo | G02B 13/0045 | 359/714 |
| 2015/0370046 A1* | 12/2015 | Chen | G02B 9/62 | 359/713 |

(56) References Cited

U.S. PATENT DOCUMENTS

2016/0025994 A1* 1/2016 Shagam ............... G01N 21/255
                                                356/440
2016/0033743 A1* 2/2016 Chen ..................... G02B 9/64
                                                359/708
2016/0056899 A1* 2/2016 Zhu ...................... H04B 10/60
                                                398/212

* cited by examiner

LED OPTICAL COMMUNICATION RECEIVING LENS AND LED OPTICAL COMMUNICATION SYSTEM

CROSS-REFERENCE TO RELATED APPLICATIONS

This application claims all benefits accruing under 35 U.S.C. §119 from China Patent Application No. 201410411178.5, filed on Aug. 20, 2014, in the China Intellectual Property Office. Disclosures of the above-identified applications are incorporated herein by reference.

FIELD

The present application relates to a LED optical communication receiving lens and a LED optical communication system including the LED optical communication receiving lens.

BACKGROUND

Grantham K. H. Pang first proposes visible light communication technology. Based on infrared communication, Grantham K. H. Pang proposes an indoor visible communication for audio transmitting, and makes signals of CD music or telephone transmit to earphone. Maosao Nakagawa has studied on multipath effect, shadowing effect, and intersymbol interference of the indoor visible communication. People pay more attention to the research of encoding mode and communication protocol of communication.

However, there is little research on optical system of an optical communication terminal. Optical system of an optical communication receiving terminal decides field of view and received light energy of communication system, which affects communication rate and signal-noise ratio (SNR). There is not a receiving lens with wide field of view and miniaturized in prior art.

What is needed, therefore, is to provide a LED optical communication receiving lens and a LED optical communication system including the LED optical communication receiving lens that can overcome the above-described shortcomings.

BRIEF DESCRIPTION OF THE DRAWINGS

Implementations of the present technology will now be described, by way of example only, with reference to the attached figures, wherein.

DETAILED DESCRIPTION

Figure 1:
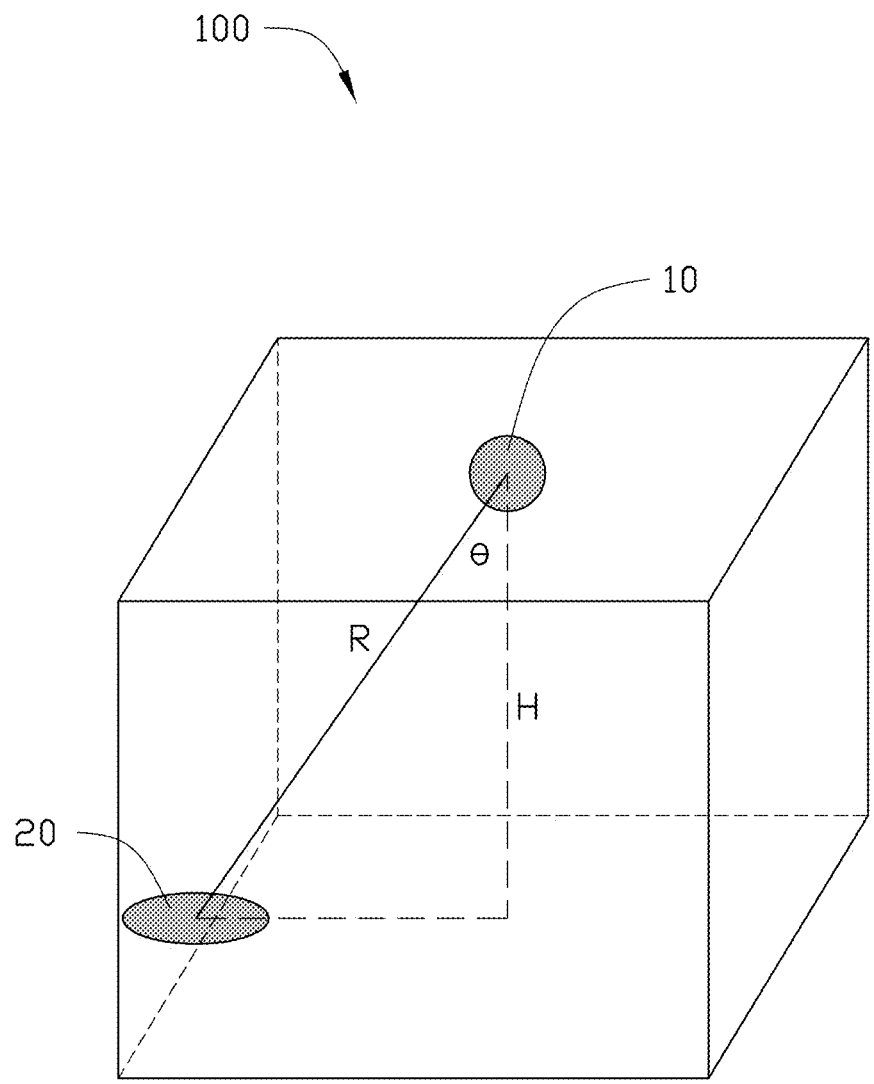
FIG. 1 is a schematic view of one embodiment of a LED optical communication system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, a LED optical communication system 100 of one embodiment includes a LED light source 10 and a signal receiving terminal 20. In one embodiment, the LED optical communication system 100 can be located in a standard room with a length of about 5 meters, a width of about 5 meters, and a height of about 4 meters.

The LED light source 10 can be used for lighting and sending communication signal. That is, the LED light source 10 can be a communication signal transmitting terminal sending communication signal. The communication signal transmitting terminal is similar to a WIFI signal source. The WIFI signal source transmits signals through electromagnetic wave, but the LED light source 10 transmits signals through visible light. The LED light source 10 can be placed anywhere in the standard room. In one embodiment, the LED light source 10 is located in a middle of roof of the standard room. Power and luminescent efficiency of the LED light source 10 can be selected according to need. In one embodiment, the power of the LED light source 10 is about 1 watt, and the luminescent efficiency of the LED light source 10 is about 100 lumens per watt.

The signal receiving terminal 20 can be used to receive communication signals. The signal receiving terminal 20 can be placed anywhere in the standard room. In one embodiment, the signal receiving terminal 20 is located in a corner of the standard room.

Figure 2:
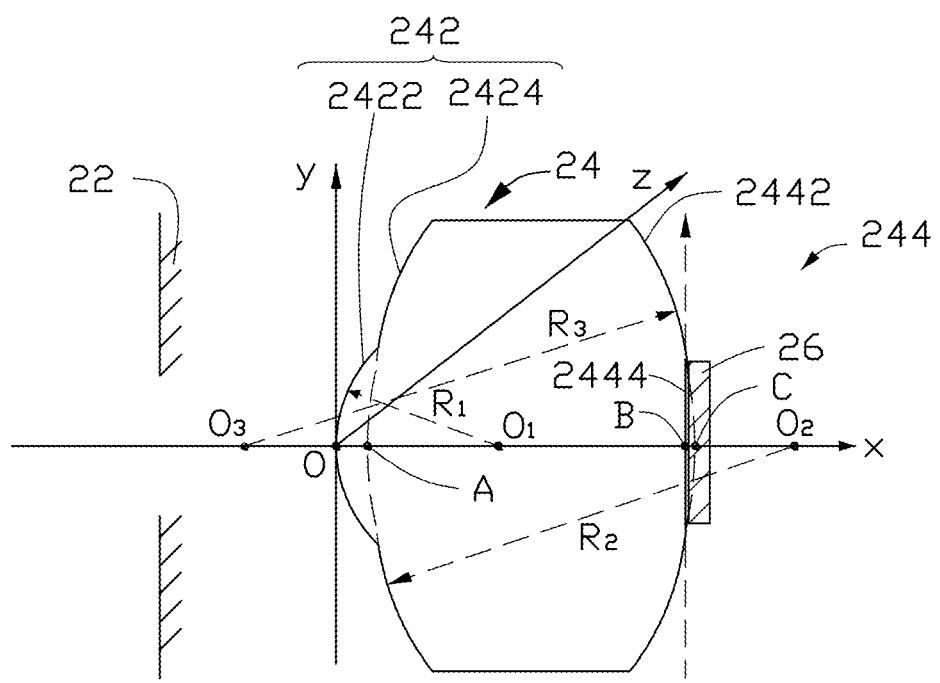
FIG. 2 is a schematic view of one embodiment of a signal receiving terminal in the LED optical communication system.
Figure 3:
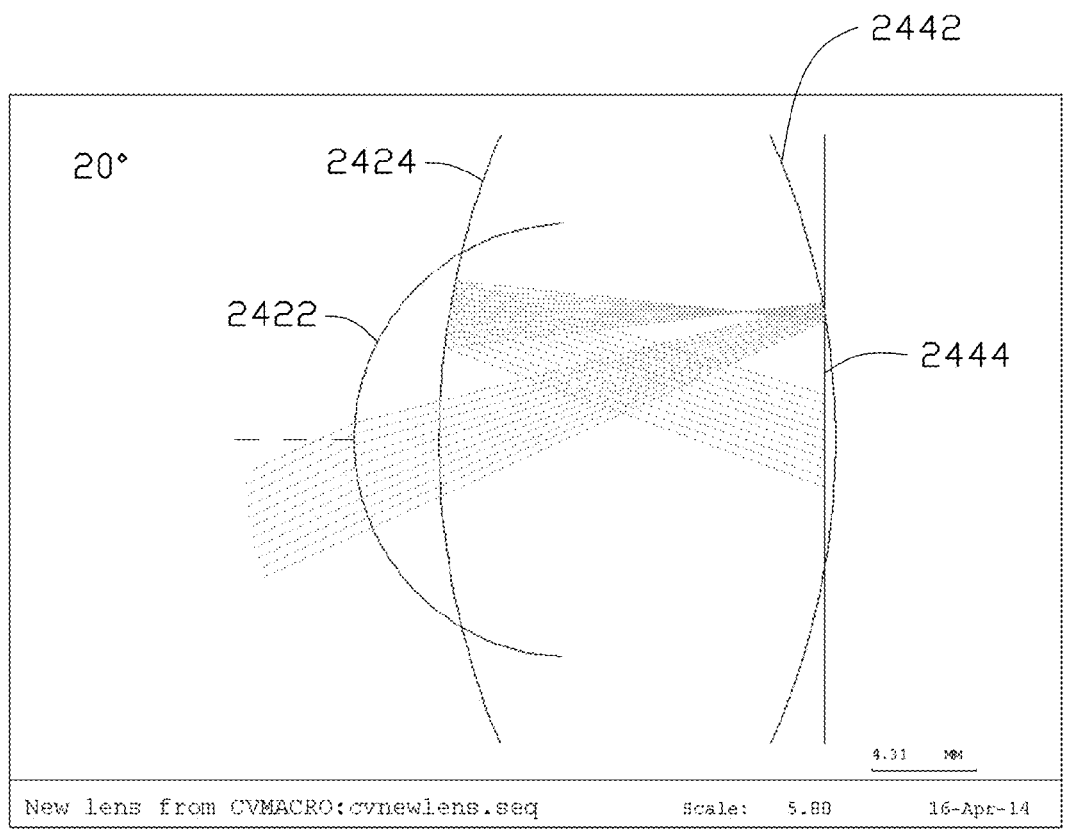
FIG. 3 is an optical path view of one embodiment of a LED optical communication receiving lens regarding a field of view with about 20°.
Figure 4:
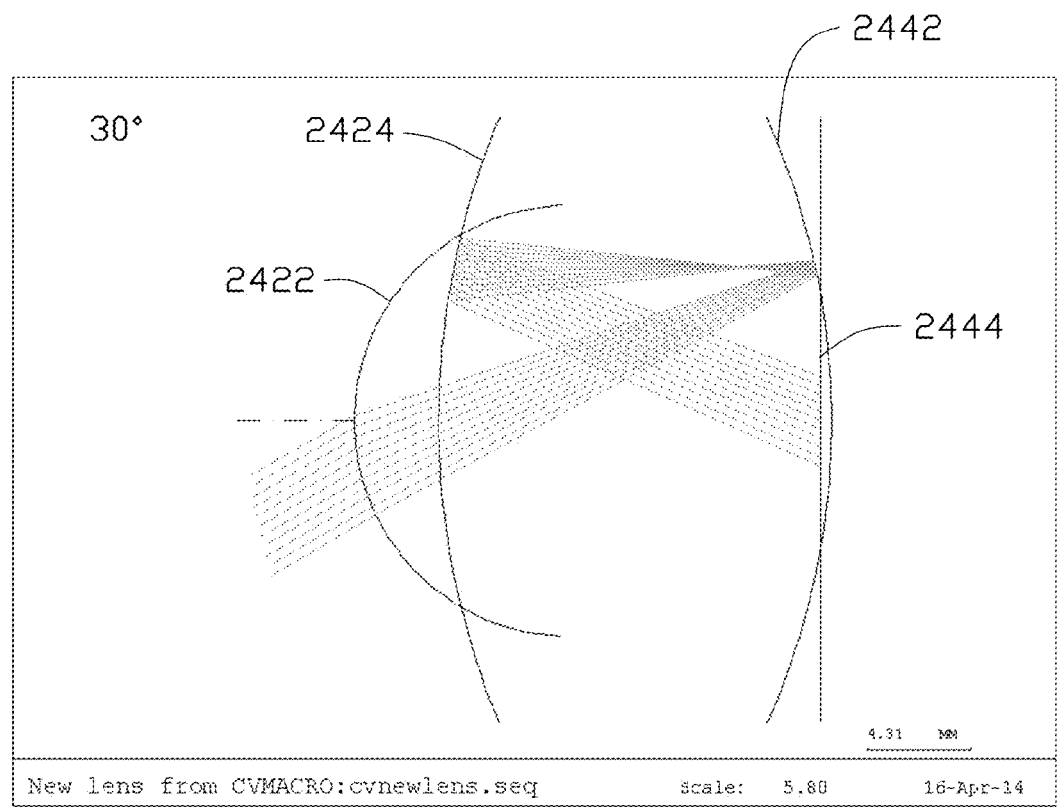
FIG. 4 is an optical path view of one embodiment of the LED optical communication receiving lens regarding a field of view with about 30°.
Figure 5:
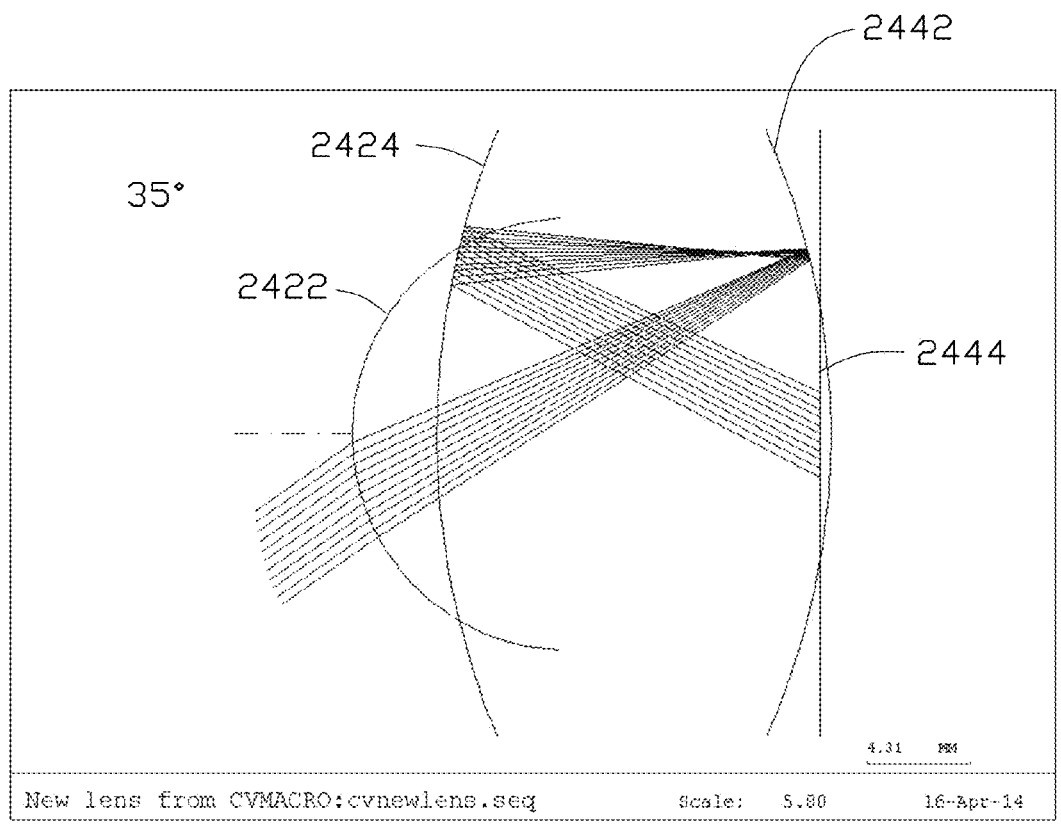
FIG. 5 is an optical path view of one embodiment of the LED optical communication receiving lens regarding a field of view with about 35°.
Figure 6:
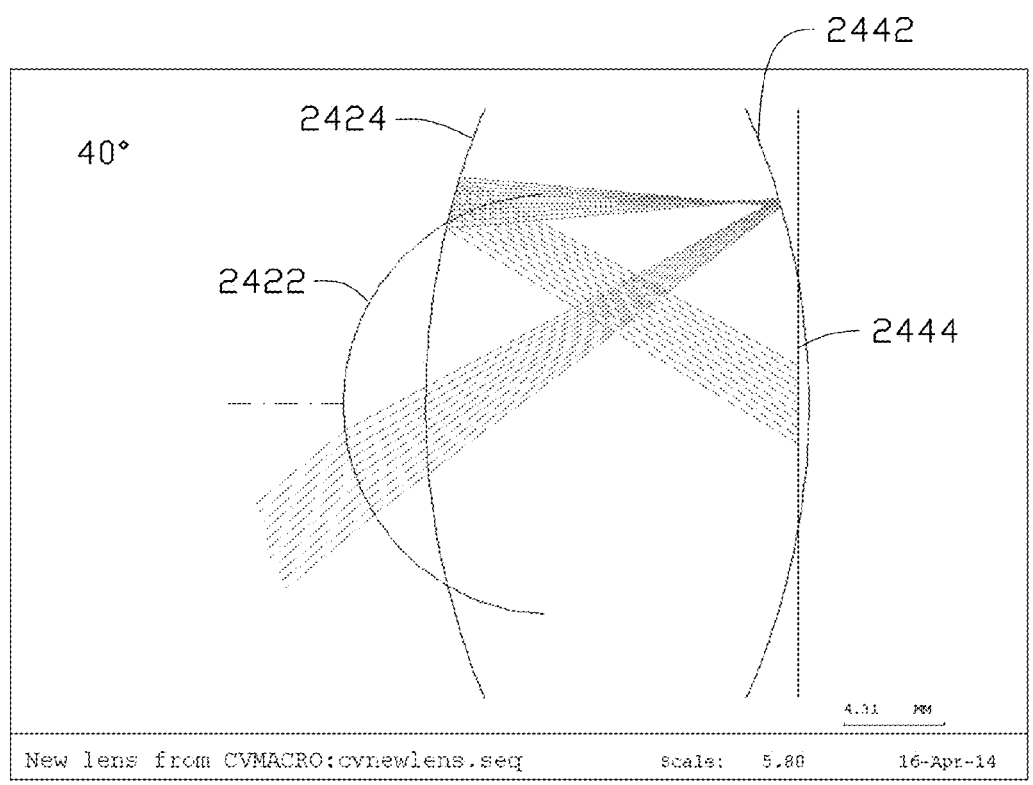
FIG. 6 is an optical path view of one embodiment of the LED optical communication receiving lens regarding a field of view with about 40°.
Figure 7:
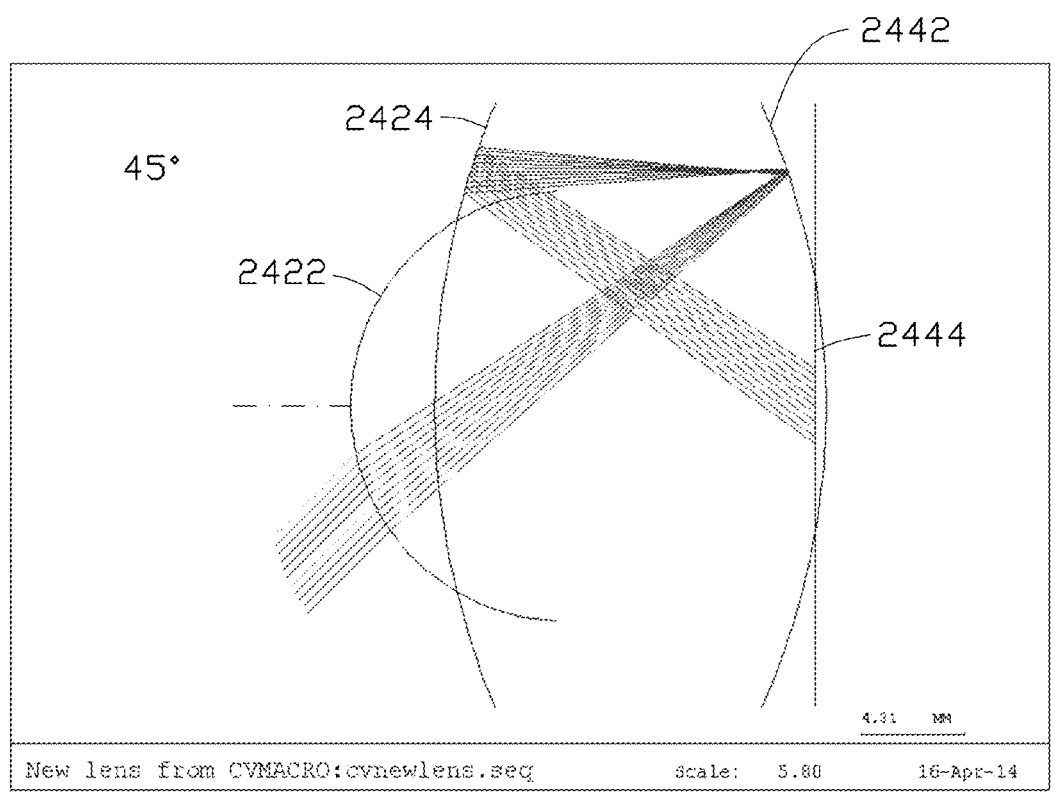
FIG. 7 is an optical path view of one embodiment of the LED optical communication receiving lens regarding a field of view with about 45°.
Figure 8:
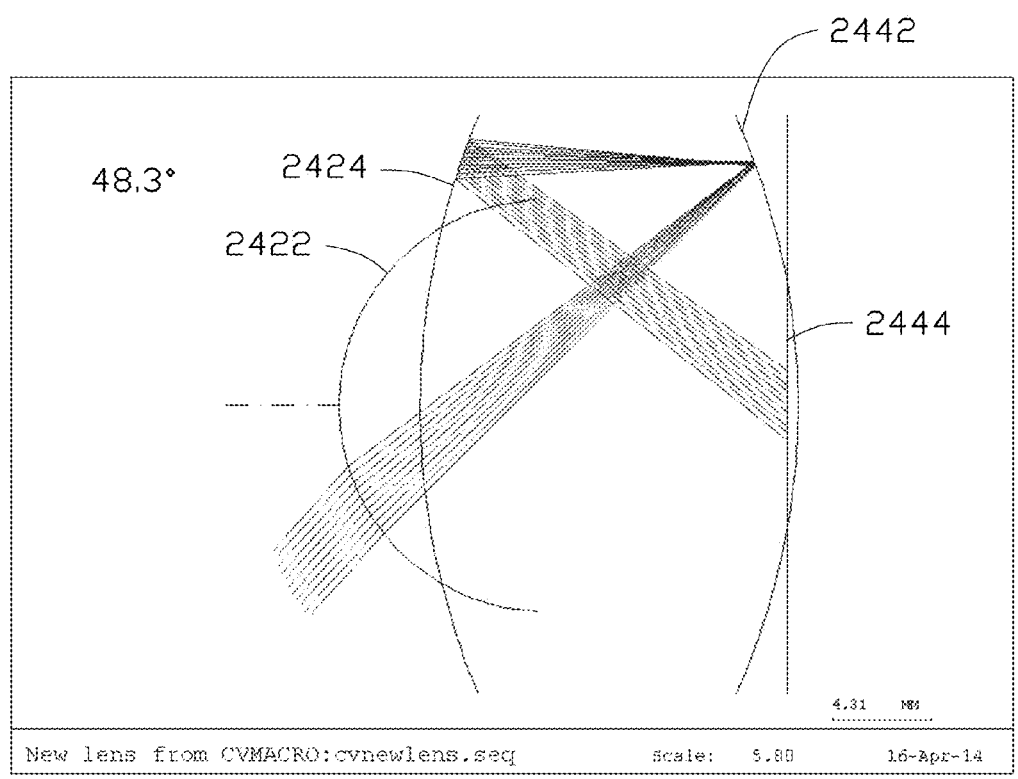
FIG. 8 is an optical path view of one embodiment of the LED optical communication receiving lens regarding a field of view with about 48.3°.
Figure 9:
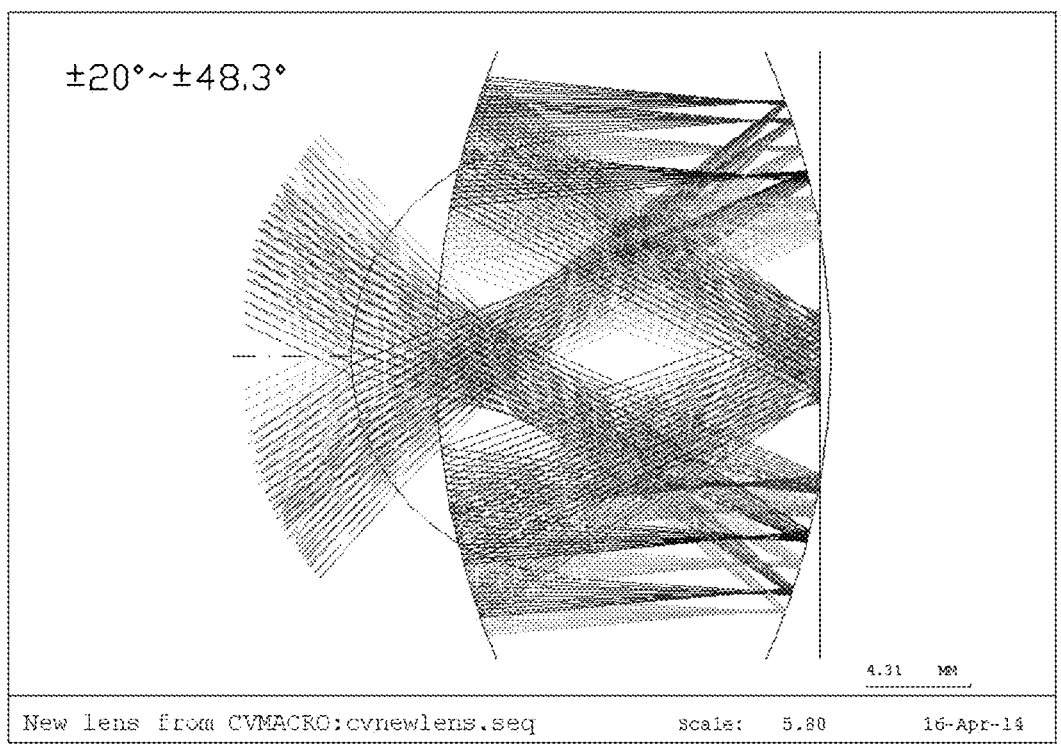
FIG. 9 is an stacked optical path view of one embodiment of the LED optical communication receiving lens regarding field of views from about ±20° to about ±48.3°.

Referring to FIG. 2, the signal receiving terminal 20 includes an aperture 22, a LED optical communication receiving lens 24, and a photoreceptor 26. The LED optical communication receiving lens 24 can be located between the aperture 22 and the photoreceptor 26. Lights radiated from the LED light source 10 successively pass through the aperture 22, the LED optical communication receiving lens 24, and arrives at the photoreceptor 26.

The LED optical communication receiving lens 24 can be a solid lens. The position of the LED optical communication receiving lens 24 is defined as a three-dimensional Cartesian coordinate system (x, y, z). A caliber of the LED optical communication receiving lens 24 is about 23.4 mm. The maximum thickness of the LED optical communication receiving lens 24 along the z axis direction is about 23.4 mm. The LED optical communication receiving lens 24 includes a first surface 242 and a second surface 244 opposite to the first surface 242. The field of view of the first surface 242 ranges from about 0° to about 48.3°, and illumination value of each field of view is larger than about 1 lux. The material of the LED optical communication receiving lens 24 can be selected to need. In one embodiment, the material of the LED optical communication receiving lens 24 is K9 glass.

The first surface 242 includes a first spherical surface 2422 and a second spherical surface 2424 connected to the first spherical surface 2422. The sphere center $O_1$ of the first spherical surface 2422 and the sphere center $O_2$ of the second spherical surface 2424 are located on the x axis. The first spherical surface 2422 can be a transmitted surface, the lights can pass through the first spherical surface 2422 and enter the LED optical communication receiving lens 24. The symmetric central point of the first spherical surface 2422 can coincide with the origin (0, 0, 0) of the three-dimensional Cartesian coordinate system (x, y, z). The radius $R_1$ of the first spherical surface 2422 can be about 9.086 mm.

The second spherical surface 2424 can be a reflective surface. When the lights entering the LED optical communication receiving lens 24 irradiate or arrive at the second spherical surface 2424, the lights can be reflected by the second spherical surface 2424. The symmetric central point coordinate of the second spherical surface 2424 can be about (3.540, 0, 0), and the radius $R_2$ of the second spherical surface 2424 can be about 33.040 mm.

The second surface 244 includes a third spherical surface 2442 and a planar surface 2444 connected to the third spherical surface 2442. The sphere center $O_3$ of the third spherical surface 2442 is also located on the x axis. The third spherical surface 2442 can be also a reflective surface. When the lights entering the LED optical communication receiving lens 24 irradiates the third spherical surface 2442, the lights can be reflected by the third spherical surface 2442. The symmetric central point coordinate of the third spherical surface 2442 can be about (20.060, 0, 0), and the radius $R_3$ of the third spherical surface 2442 can be about −31.152 mm. The planar surface 2444 can be a transmitted surface. The planar surface 2444 can be parallel to a planar surface formed by the y axis and the z axis. The coordinate of an intersection point formed by the planar surface 2444 and the x axis can be about (19.588, 0, 0). It can be understood, the reflective surface can be formed by locating a reflective film on the second spherical surface 2424 or the third spherical surface 2442.

The aperture 22 can be selected according to need. The aperture 22 can be adjacent to the first surface 242. The first surface 242 can be between the aperture 22 and the second surface 244.

The photoreceptor 26 can be selected according to need. The photoreceptor 26 can directly contact with the planar surface 2444. The diameter of the photoreceptor 26 can be selected according to need. In one embodiment, the diameter of the photoreceptor 26 is about 3 mm.

Referring to FIGS. 3-9, for wide field of view, the "fold-back lens" is equivalent to a telescope system, and lights from different field of views can overlap on the photoreceptor 26.

The illumination value of different field of views of the LED optical communication receiving lens 24 on the photoreceptor 26 can be obtained by formula:

$$E_k = \frac{\phi \cos^4 \theta D^2}{\pi H^2 D_i^2} \eta.$$

The letter ϕ represents luminous flux of the LED light source 10. The letter φ represents an angle between a line connecting the signal receiving terminal 20 with the LED light source 10 and a longitudinal direction, wherein the longitudinal direction is perpendicular to a plane, and the signal receiving terminal 20 is located on the plane. The letter D represents entrance pupil of the LED optical communication receiving lens 24. The letter H represents a distance between the LED light source 10 and the plane, wherein the signal receiving terminal 20 is located on the plane. The letter $D_i$ represents the diameter of the photoreceptor 26. The letter η represents a ratio of light energy actually received by the photoreceptor 26 and light energy though the entrance pupil.

Table 1 shows the illumination values of different field of views of the LED optical communication receiving lens 24. For lights of different field of views range from about 0° to about 48.3°, the illumination value of each field of view is larger than about 1 lux.

TABLE 1

| field of view (°) | entrance pupil (mm) | η | illumination values (lux) |
|---|---|---|---|
| 48.3 | 4.7 | 0.708 | 1.09 |
| 45 | 4.4 | 0.867 | 1.50 |
| 40 | 4.2 | 0.983 | 2.13 |
| 38 | 4 | 1 | 2.20 |
| 20 | 3.6 | 1 | 3.60 |
| 18 | 3.6 | 1 | 3.78 |
| 17 | 3.6 | 0.952 | 3.68 |
| 16 | 3.6 | 0.867 | 3.42 |
| 15 | 3.5 | 0.818 | 3.11 |
| 14 | 3.5 | 0.708 | 2.74 |
| 13 | 3.5 | 0.591 | 2.33 |
| 12 | 3.48 | 0.470 | 1.86 |
| 11 | 3.48 | 0.350 | 1.41 |
| 10 | 11.4 | 0.048 | 3.03 |
| 9 | 11.4 | 0.048 | 2.66 |
| 8 | 11.4 | 0.133 | 5.93 |
| 0 | 11.4 | 0.270 | 12.71 |

In summary, the LED optical communication receiving lens 24 has smaller caliber and thickness, and the LED optical communication receiving lens 24 can directly contact with the photoreceptor 26, thus the LED optical communication system 100 has smaller volume and size. The LED optical communication system 100 only includes one optical element, thus it is easy to install the LED optical communication system 100. Moreover, the LED optical communication receiving lens 24 has wider field of view and can meet design requirement. Furthermore, for lights of different field of views, the illumination value of each field of view is larger than about 1 lux, thus there is no blind spot of field of view.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may include some indication in reference to certain steps. However, the indication used is only to be viewed for identification purposes and not as a suggestion as to an order for the steps.

What is claimed is:

1. A LED optical communication receiving lens, comprising:
   a first surface comprising a first spherical surface and a second spherical surface connected to the first spherical surface; and
   a second surface opposite to the first surface, the second surface comprises a third spherical surface and a planar surface connected to the third spherical surface;
   wherein a position of the LED optical communication receiving lens is defined as a three-dimensional Cartesian coordinate system (x, y, z); a sphere center and a symmetric central point of the first spherical surface, a sphere center and a symmetric central point of the second spherical surface, a sphere center and a symmetric central point of the third spherical surface are located on the x axis; the first spherical surface and the planar surface are transmitted surfaces; the symmetric central point of the first spherical surface is located on an origin (0, 0, 0) of the three-dimensional cartesian coordinate system (x, y, z); the planar surface is parallel to a surface formed by the y axis and the z axis; the second spherical surface and the third spherical surface are reflective surfaces; field of views of the LED optical communication receiving lens ranges from about 0° to about 48.3°, and an illumination value of each field of view is larger than about 1 lux.

2. The LED optical communication receiving lens of claim 1, wherein a caliber of the LED optical communication receiving lens is about 23.4 mm.

3. The LED optical communication receiving lens of claim 1, wherein a first spherical surface radius is about 9.086 mm, a symmetric central point coordinate of the second spherical surface is about (3.540, 0, 0), and a second spherical surface radius is about 33.040 mm.

4. The LED optical communication receiving lens of claim 1, wherein a symmetric central point coordinate of the third spherical surface is about (20.060, 0, 0), a third spherical surface radius is about −31.152 mm, and an intersection point coordinate formed by the planar surface and the x axis is about (19.588, 0, 0).

5. The LED optical communication receiving lens of claim 1, wherein a material of the LED optical communication receiving lens is K9 glass.

6. The LED optical communication receiving lens of claim 1, wherein the reflective surfaces are formed by locating a reflective film on the second spherical surface or the third spherical surface.

7. A LED optical communication system, comprising:
   a LED light source configured to send a communication signal;
   a signal receiving terminal confiugred to receive the communication signal and comprising an aperture, a LED optical communication receiving lens, and a photoreceptor;
   wherein a position of the LED optical communication receiving lens is defined as a three-dimensional Cartesian coordinate system (x, y, z), and the LED optical communication receiving lens comprising:
      a first surface comprising a first spherical surface and a second spherical surface connected to the first spherical surface; and
      a second surface opposite to the first surface, the second surface comprises a third spherical surface and a planar surface connected to the third spherical surface;
      wherein a sphere center and a symmetric central point of the first spherical surface, a sphere center and a symmetric central point of the second spherical surface, a sphere center and a symmetric central point of the third spherical surface are located on the x axis; the first spherical surface and the planar surface are transmitted surfaces; the symmetric central point of the first spherical surface is located on an origin (0, 0, 0) of the three-dimensional cartesian coordinate system (x, y, z); the planar surface is parallel to a surface formed by the y axis and the z axis; the second spherical surface and the third spherical surface are reflective surfaces; field of views of the LED optical communication receiving lens ranges from about 0° to about 48.3°, and an illumination value of each field of view is larger than about 1 lux.

8. The LED optical communication system of claim 7, wherein a caliber of the LED optical communication receiving lens is about 23.4 mm.

9. The LED optical communication system of claim 7, wherein a first spherical surface radius is about 9.086 mm, a symmetric central point coordinate of the second spherical surface is about (3.540, 0, 0), and a second spherical surface radius is about 33.040 mm.

10. The LED optical communication system of claim 7, wherein a symmetric central point coordinate of the third spherical surface is about (20.060, 0, 0), a third spherical surface radius is about −31.152 mm, and an intersection point coordinate formed by the planar surface and the x axis is about (19.588, 0, 0).

11. The LED optical communication system of claim 7, wherein the first surface is between the aperture and the second surface.

12. The LED optical communication system of claim 7, wherein the LED optical communication receiving lens is located between the aperture and the photoreceptor.

* * * * *